July 10, 1923.                      1,461,481
F. B. GIST ET AL
DOLLY JACK
Filed April 23, 1921
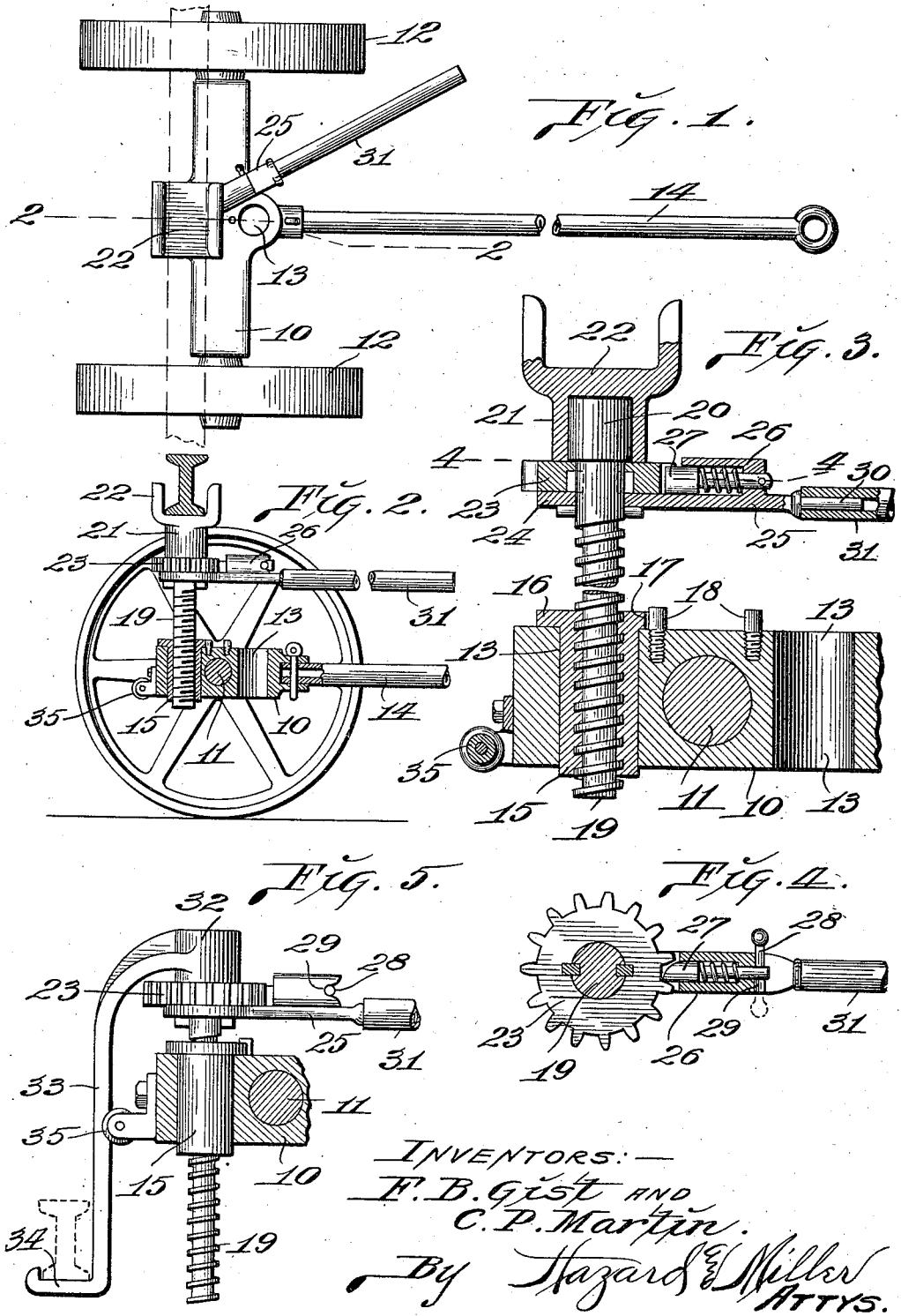
INVENTORS:—
F. B. Gist AND
C. P. Martin.
By Hazard & Miller
ATTYS.

Patented July 10, 1923.

1,461,481

UNITED STATES PATENT OFFICE.

FELTA B. GIST AND CHARLES P. MARTIN, OF ORANGE, CALIFORNIA.

DOLLY JACK.

Application filed April 23, 1921. Serial No. 463,805.

*To all whom it may concern:*

Be it known that we, FELTA B. GIST and CHARLES P. MARTIN, citizens of the United States, residing at Orange, in the county of Orange and State of California, have invented new and useful Improvements in Dolly Jacks, of which the following is a specification.

Our invention relates generally to dollies that are utilized for supporting and towing motor vehicles that can not be driven by their own power, and more particularly, to an attachment in the nature of a jack screw that is adapted to be detachably applied to the body of the dolly and which attachment may be advantageously used for engaging and lifting a part of the motor vehicle and supporting the same in a solid and substantial manner while so supported and while being towed.

The principal objects of our invention are to provide a simple and efficient lifting and carrying device that can be readily applied to or removed from practically all types of dollies that are now generally used for supporting and towing motor vehicles, to provide a lifting and carrying attachment for dollies that can be easily and quickly manipulated to engage and lift a vehicle so that it may be readily towed, and, further, to provide a lifting and carrying device that will minimize the time and labor involved in jacking and blocking up a vehicle that is to be towed.

With the foregoing and other objects in view, our invention consists in certain novel features of construction and arrangement of parts that will be hereinafter more fully described and claimed and illustrated in the accompanying drawings, in which Fig. 1 is a top plan view of a lifting and carrying device of our improved construction.

Fig. 2 is a cross section taken approximately on the line 2—2 of Fig. 1.

Fig. 3 is an enlarged vertical section taken through the center of our improved lifting and carrying device, and showing the same applied to the body of a dolly.

Fig. 4 is a horizontal section taken approximately on the line 4—4 of Fig. 3.

Fig. 5 is a sectional view showing an attachment that is utilized for engaging and lifting a vehicle part that rests directly upon the ground.

Referring by numerals to the accompanying drawings, which illustrate a practical embodiment of our invention, 10 designates the body of a dolly, the same comprising an elongated block of metal, and extending lengthwise therethrough is a shaft 11, on the ends of which are journaled wheels 12.

Formed through the dolly body 10 and on opposite sides of the shaft 11, are vertically disposed apertures such as 13, either one of which is adapted to receive our improved attachment.

Two of these apertures 13 are provided, in order that the lifting and carrying attachment may be conveniently positioned when applied to the dolly body for engaging and lifting a part of a vehicle, such as the front or rear axle.

Detachably secured to the front side of the body 10, is one end of an elongated tubular member 14 that performs the functions of a tongue when the dolly is used for towing a vehicle.

Our improved attachment includes an internally threaded socket member 15 that is adapted to be positioned in either one of the apertures 13, and the upper end of said socket member is provided with an outwardly projecting flange 16 that is adapted to rest on top of the body 10. Formed in this flange 16 is a notch 17 and which latter receives a pin 18 that is seated in the top of the dolly body 10, such construction holding the socket member 15 against rotation when applied to said dolly body.

Screw seated in the socket 15 is a threaded shaft 19, the upper end of which is provided with an integrally formed head 20, and removably and rotatably positioned thereupon, is a cap 21 with which is formed integral, a substantially U-shaped yoke or saddle 22 that is adapted to receive a part of a motor vehicle, for instance, the front or rear axle, or a part of the frame.

Secured in any suitable manner to the upper portion of the threaded shaft 19, and preferably at a point immediately beneath head 20, is a ratchet wheel 23, and loosely arranged on the upper portion of shaft 19, immediately beneath this ratchet wheel, is a disc 24 with which is formed integral, a laterally projecting arm 25.

Formed integral with or fixed to this arm 25, is a housing 26 in which is arranged for operation, a spring pressed pawl 27 the forward end of which is adapted to engage between the teeth of ratchet wheel 23, and in order that said pawl may be utilized for moving the ratchet wheel in both directions, said pawl is constructed so that its position may be reversed; and to this end, a laterally projecting pin such as 28 is seated in the rear end portion of said pawl, and said pin being adapted to engage in either one of a pair of notches such as 29 that are formed in the sides of housing 26 at the rear or outer end thereof. Arm 25 terminates in a shank 30, upon which may be detachably positioned the inner end of an extension handle 31.

When it is desired to lift and carry a part of a vehicle with our improved dolly, the same is manipulated so that the yoke or saddle 23 is directly beneath the part to be engaged and lifted, and handle 31 is now moved back and forth to effect an engagement of the forward end of pawl 27 with the teeth of the ratchet wheel 33, thereby rotating the same and consequently rotating the threaded shaft 19, upon which said ratchet wheel is mounted.

The threaded shaft 19 operating in socket 15 will be elevated as it is thus rotated, which movement is brought about by the engagement of the threads of shaft 19 with the threads in said socket and, as a result, the engaged axle or vehicle part can be elevated to the desired height, and, by making the tongue 14 fast to a part of the vehicle body or to a part of the towing vehicle, the dolly supported vehicle can be readily towed to the point of repair or storage.

To remove the dolly from beneath the vehicle, it is only necessary to reverse the position of the pawl 27, which is done by engaging pin 28 and withdrawing said pawl from engagement with the teeth of ratchet wheel 23; rotating said pawl a half turn, and permitting its point to re-engage with the teeth of said ratchet wheel and then rotating shaft 19 by manipulation of the handle 31 and arm 25.

In order to engage and lift a motor vehicle part such as an axle while the same is in direct engagement with the ground, we have devised the attachment illustrated in Fig. 5, said attachment comprising a cap 32 that is adapted to fit over head 20, and projecting outwardly and downwardly from the side of said cap, is an arm 33 that terminates in a laterally projecting hook 34. Obviously, when this attachment is applied to the upper end of the screw rod 19, saddle 22 is removed, and, when cap 32 is applied to head 20 and the screw rod 19 is screwed downwardly through socket 15, the laterally projecting hook 34 can be lowered to a point where it can be readily engaged beneath an axle or vehicle frame part that is directly upon the ground.

Where this form of lifting attachment is utilized, we prefer to arrange on the side of the dolly body 10, a roller bearing 35 against which the vertical portion of the arm 33 bears while in operation.

A lifting and carrying device of our improved construction is comparatively simple, may be easily and cheaply produced, is applicable to the bodies of practically all forms of dollies now in general use, and the use of said device eliminates much time and labor ordinarily involved in engaging and lifting a vehicle and placing the same in position to be carried by a dolly.

It will be readily understood that minor changes in the size, form and construction of the various parts of our improved lifting and carrying device may be made and substituted for those herein shown and described, without departing from the spirit of our invention, the scope of which is set forth in the appended claims.

We claim as our invention:

1. In combination, a dolly having an aperture formed therein, a socket member mounted within the aperture, a notched flange formed on one end of the socket member, a pin removably mounted in the dolly and engaging the notch of said flange for locking the socket member against rotation within the aperture, a threaded shaft mounted in the socket member, a head formed on the upper end of the shaft, a wheel having radially extending teeth fixed to the shaft, an arm pivoted on the shaft, a spring pressed pawl carried by the arm and normally engaging said teeth, an operating handle connected to the arm, and means for rotating the pawl to cause the latter to engage the teeth of said wheel to effect rotation of said shaft in one direction or the other, according as the arm is moved in one direction or the other.

2. In combination, a dolly, a jack supported on the dolly and including a shaft having a head formed on the upper end thereof, a cap sustained on the head, an arm extending downwardly from the cap and fixed thereto, a hook formed on the lower end of the arm, and a roller positioned on the dolly and contacting with said arm.

In testimony whereof we have signed our names to this specification.

FELTA B. GIST.
CHARLES P. MARTIN.